(12) United States Patent
Weston

(10) Patent No.: US 11,872,537 B2
(45) Date of Patent: Jan. 16, 2024

(54) METAL-ORGANIC FRAMEWORKS FOR CARBON DIOXIDE CAPTURE

(71) Applicant: ExxonMobil Technology and Engineering Company, Annandale, NJ (US)

(72) Inventor: Simon C. Weston, Annandale, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 84 days.

(21) Appl. No.: 17/393,544

(22) Filed: Aug. 4, 2021

(65) Prior Publication Data

US 2022/0040668 A1 Feb. 10, 2022

Related U.S. Application Data

(60) Provisional application No. 63/062,034, filed on Aug. 6, 2020.

(51) Int. Cl.
*B01D 53/04* (2006.01)
*B01J 20/22* (2006.01)
*B01J 20/34* (2006.01)
*C07F 3/02* (2006.01)

(52) U.S. Cl.
CPC ............ *B01J 20/226* (2013.01); *B01D 53/04* (2013.01); *B01J 20/3466* (2013.01); *C07F 3/02* (2013.01); *B01D 2253/204* (2013.01); *B01D 2257/504* (2013.01); *B01D 2259/4009* (2013.01)

(58) Field of Classification Search
CPC ........ B01D 53/02; B01D 53/04; B01J 20/226; B01J 20/3466; C07F 3/02
See application file for complete search history.

(56) References Cited

U.S. PATENT DOCUMENTS

| 2,011,550 A | 8/1935 | Leonard |
| 8,974,576 B2 | 3/2015 | Gupta et al. |
| 9,968,882 B2 | 5/2018 | Weston et al. |
| 10,780,388 B2 * | 9/2020 | Long ...................... B01D 53/02 |
| 10,953,385 B2 | 3/2021 | Long et al. |
| 11,014,067 B2 | 5/2021 | Weston et al. |

(Continued)

FOREIGN PATENT DOCUMENTS

| WO | 2013/059527 A1 | 4/2013 |
| WO | 2018/152438 A1 | 8/2018 |
| WO | 2022/032281 A1 | 2/2022 |

OTHER PUBLICATIONS

Bacsik, Z. et al., (2011) "Mechanisms and kinetics for sorption of CO2 on bicontinuous mesoporous silica modified with n-propylamine", Langmuir, vol. 27, pp. 11118-11128.

(Continued)

*Primary Examiner* — Sharon Pregler
(74) *Attorney, Agent, or Firm* — SHOOK, HARDY & BACON L.L.P.

(57) ABSTRACT

The present application relates to absorbents comprising tetraamine ligands grafted onto metal-organic frameworks and a method for using same for $CO_2$ capture from fossil fuel combustion sources to reduce emissions. In particular, this application relates to capturing >90% by volume, preferable >99% by volume, $CO_2$ emissions such that the emissions are negative, essentially removing $CO_2$ from the combustion air.

15 Claims, 4 Drawing Sheets

(56) References Cited

U.S. PATENT DOCUMENTS

| | | | |
|---|---|---|---|
| 11,103,826 | B2 | 8/2021 | Weston |
| 2019/0022573 | A1 | 1/2019 | Weston |
| 2019/0039015 | A1 | 2/2019 | Long et al. |
| 2019/0060867 | A1 | 2/2019 | Long et al. |
| 2019/0126237 | A1 | 5/2019 | Weston et al. |
| 2022/0176343 | A1* | 6/2022 | Weston ............... B01J 20/226 |
| 2022/0266219 | A1* | 8/2022 | Abney ............... B01J 20/226 |
| 2022/0401915 | A1* | 12/2022 | Koh ............... B01J 20/28042 |

OTHER PUBLICATIONS

Bhown, A. S. et al., (2011) "Analysis and status of post-combustion carbon dioxide capture technologies", Environmental science & technology, vol. 45, pp. 8624-8632.

Boot-Handford, M. E. et al., (2014) "Carbon capture and storage update", Energy & Environmental Science, vol. 7, No. 1, pp. 130-189.

Cao, Y. et al., (2013) "Capture of carbon dioxide from flue gas on TEPA-grafted metal-organic framework Mg2 (dobdc)", Journal of Environmental Sciences, vol. 25, No. 10, pp. 2081-2087.

Choi, S. et al., (2009) "Adsorbent materials for carbon dioxide capture from large anthropogenic point sources", ChemSusChem: Chemistry & Sustainability Energy & Materials, vol. 2, pp. 796-854.

D'alessandro, D. M. et al., (2010) "Carbon dioxide capture: prospects for new materials", Angewandte Chemie International Edition, vol. 49, pp. 6058-6082.

Didas, S. A. et al., (2014) "Effect of Amine Surface Coverage on the Co-Adsorption of CO2 and Water: Spectral Deconvolution of Adsorbed Species", The journal of physical chemistry letters, vol. 5, pp. 4194-4200.

Drage, T. C. et al., (2012) "Materials challenges for the development of solid sorbents for post-combustion carbon capture", Journal of Materials Chemistry, vol. 22, pp. 2815-2823.

Eddaoudi, M et al., (2002) "Systematic design of pore size and functionality in isoreticular MOFs and their application in methane storage", Science, vol. 295, pp. 469-472.

Feron, P. et al., (2019) "Towards Zero Emissions from Fossil Fuel Power Stations", International Journal of Greenhouse Gas Control, vol. 87, pp. 188-202.

Fracaroli, A. M. et al., (2014) "Metal-Organic Frameworks with Precisely Designed Interior for Carbon Dioxide Capture in the Presence of Water", Journal of the American Chemical Society, vol. 136, pp. 8863-8866.

Franchi, R. S. et al., (2005) "Applications of pore-expanded mesoporous silica. 2. Development of a high-capacity, water-tolerant adsorbent for CO2", Industrial & Engineering Chemistry Research, vol. 44, pp. 8007-8013.

Fredriksen, S. B. et al., (2013) "Oxidative degradation of aqueous amine solutions of MEA, AMP, MDEA, Pz: A review", Energy Procedia, vol. 37, pp. 1770-1777.

Furukawa, H. et al., (2013) "The Chemistry and Applications of Metal-Organic Frameworks", Science, vol. 341, pp. 1230444-1230412.

Gouedard, C. et al., (2012) "Amine degradation in CO2 capture. I. A review", International Journal of Greenhouse Gas Control, vol. 10, pp. 244-270.

Haszeldine, R. S.," (2009) Carbon capture and storage: how green can black be?", Science vol. 325,pp. 1647-1652.

Kim, C. et al., (2016) "An ethylenediamine-grafted Y zeolite: a highly regenerable carbon dioxide adsorbent via temperature swing adsorption without urea formation", Energy & Environmental Science, vol. 9, pp. 1803-1811.

Lackner, K. S. et al., (2012) "The urgency of the development of CO2 capture from ambient air", Proceedings of the National Academy of Sciences, vol. 109, No. 33, pp. 13156-13162.

Lee, S. Y. et al., (2015) "A review on solid adsorbents for carbon dioxide capture", Journal of Industrial and Engineering Chemistry, vol. 23, pp. 1-11.

Li, J. R. et al., (2011) "Carbon dioxide capture-related gas adsorption and separation in metal-organic frameworks", Coordination Chemistry Reviews, vol. 255, pp. 1791-1823.

Liao, P. Q. et al., (2016) "Putting an ultrahigh concentration of amine groups into a metal-organic framework for CO2 capture at low pressures", Chemical science, vol. 7, pp. 6528-6533.

Lin, Y. et al., (2016) "Amine-functionalized metal-organic frameworks: structure, synthesis and applications", The Royal Society of Chemistry (RSC) advances, vol. 6, pp. 32598-32614.

Liu, J. et al., (2012) "Progress in adsorption-based CO2 capture by metal-organic frameworks", Chemical Society Reviews, vol. 41, pp. 2308-2322.

Liu, Y. et al., (2012) "Recent advances in carbon dioxide capture with metal-organic frameworks", Greenhouse Gases: Science and Technology, vol. 2, pp. 239-259.

Mason, J. A. et al., (2015) "Application of a high-throughput analyzer in evaluating solid adsorbents for post-combustion carbon capture via multicomponent adsorption of CO2, N2, and H2O", Journal of the American Chemical society, vol. 137, pp. 4787-4803.

Mcdonald, T. M. et al., (2012) "Capture of carbon dioxide from air and flue gas in the alkylamine-appended metal-organic framework mmen-Mg2 (dobpdc)", Journal of the American Chemical Society, vol. 134, pp. 7056-7065.

Milner, P. J et al., (2018) "Overcoming double-step CO 2 adsorption and minimizing water co-adsorption in bulky diamine-appended variants of Mg 2 (dobpdc)", Chemical science, vol. 9, No. 1, pp. 160-174.

Montoro, C. et al., (2012) "Functionalisation of MOF open metal sites with pendant amines for CO2 capture", Journal of Materials Chemistry, vol. 22, pp. 10155-10158.

Pachauri et al., (2009)" ", Science 325, pp. 1599.

International Search Report & Written Opinion received for PCT Application No. PCT/US2021/071099, dated Nov. 12, 2021, 15 Pages.

Planas, N. et al., (2013) "The mechanism of carbon dioxide adsorption in an alkylamine-functionalized metal-organic framework", Journal of the American Chemical Society, vol. 135, pp. 7402-7405.

Qiao, Z. et al., (2016) "Design of amine-functionalized metal-organic frameworks for CO2 separation: the more amine, the better?", Chemical Communications, vol. 52, pp. 974-977.

Rochelle, G. T., (2009) "Amine scrubbing for CO2 capture", Science, vol. 325, pp. 1652-1654.

Sabouni, R. et al., (2014) "Carbon dioxide capturing technologies: a review focusing on metal organic framework materials (MOFs)", Environmental Science and Pollution Research, vol. 21, pp. 5427-5449.

Samanta, A. et al., (2012) "Post-combustion CO2 capture using solid sorbents: a review", Industrial & Engineering Chemistry Research, vol. 51, pp. 1438-1463.

Sayari, A. et al., (2010) "Stabilization of amine-containing CO2 adsorbents: dramatic effect of water vapor", Journal of the American Chemical Society, vol. 132, pp. 6312-6314.

Serna-Guerrero, R. et al., (2008) "New insights into the interactions of CO2 with amine-functionalized silica", Industrial & Engineering Chemistry Research, vol. 47, pp. 9406-9412.

Siegelman, R. L. et al., (2019) "Challenges and opportunities for adsorption-based CO2 capture from natural gas combined cycle emissions", Energy & environmental science, vol. 12, No. 7, pp. 2161-2173.

Siegelman, R. L. et al., (2019) "Water Enables Efficient CO2 Capture from Natural Gas Flue Emissions in an Oxidation-Resistant Diamine-Appended Metal-Organic Framework", Journal of the American Chemical Society, vol. 141, No. 33, pp. 13171-13186.

Sumida, K. et al., (2012) "Carbon dioxide capture in metal-organic frameworks", Chemical reviews, vol. 112, pp. 724-781.

Ünveren, E. E. et al., (2017) "Solid amine sorbents for CO2 capture by chemical adsorption: A review", Petroleum, vol. 3, pp. 37-50.

Veneman, R. et al., (2014) "Adsorption of CO2 and H2O on supported amine sorbents", Energy Procedia, vol. 63, pp. 2336-2345.

Wang, Y. et al., (2010) "Adsorption equilibrium of binary mixtures of carbon dioxide and water vapor on zeolites 5A and 13X", Journal of Chemical & Engineering Data, vol. 55, pp. 3189-3195.

(56) References Cited

OTHER PUBLICATIONS

Woerner et al., (2016) " ", J. Phys. Chem. C 120, pp. 360.
Xu, X et al., (2005) "Influence of moisture on CO2 separation from gas mixture by a nanoporous adsorbent based on polyethylenimine-modified molecular sieve MCM-41", Industrial & engineering chemistry research, vol. 44, pp. 8113-8119.
Yu, J. et al., (2017) "CO2 capture and separations using MOFs: computational and experimental studies", Chemical reviews, vol. 117, pp. 9674-9754.
Zhou, H. C. et al., (2012) "Introduction to metal-organic frameworks", Chemical reviews, vol. 112, pp. 673-674.
PCT/US2021/071099 International Search Report and Written Opinion dated Nov. 12, 2021.
First Examination Report received for Australian Patent Application No. 2021320985, dated Oct. 23, 2023, 3 pages.

\* cited by examiner

METAL-ORGANIC FRAMEWORKS FOR CARBON DIOXIDE CAPTURE

CROSS-REFERENCE TO RELATED APPLICATIONS

This application claims priority to and the benefit of U.S. Provisional Application No. 63/062,034, filed on Aug. 6, 2020, the disclosure of which is incorporated herein by reference in its entirety.

FIELD OF THE PRESENT DISCLOSURE

The present application relates to absorbents comprising tetraamine ligands grafted onto metal-organic frameworks and a method for using same for $CO_2$ capture from fossil fuel combustion sources to reduce emissions. In particular, this application relates to capturing >90% by volume, preferable >99% by volume, $CO_2$ emissions such that the emissions are negative, essentially removing $CO_2$ from the combustion air

BACKGROUND

Carbon dioxide ($CO_2$) generated from burning fossil fuels at thermoelectric power plants is likely a major contributor to global climate change. See, Pachauri and Meyer, Climate Change 2014: Synthesis Report. Contribution of Working Groups I, II and III to the Fifth Assessment Report of the Intergovernmental Panel on Climate Change, International Government Panel on Climate Change, Geneva, Switzerland, 2014. Accordingly, point-source post-combustion capture of $CO_2$ from the flue gas streams of fossil fuel-fired power plants, in which the $CO_2$ is separated from the other constituents of flue gas (primarily $N_2$, $O_2$, and $H_2O$) before it is released into the atmosphere, and sequestration (CCS), has been proposed as a key strategy to minimize global $CO_2$ emissions. See, Pachauri and Meyer, Ibid., Chu, 2009, Science 325, p. 1599, and Haszeldine, 2009, Science 325. p. 1647. Moreover, researchers in the field have predicted that point-source CCS may need to be supplemented with air capture techniques in which excess $CO_2$ in the atmosphere is reduced in order to address $CO_2$ contribution from mobile sources such as automobile and airplane emissions. See Lackner et al., 2012, PNAS 109(33), p. 13156.

Despite extensive exploration of solid adsorbents for $CO_2$ capture, few studies have examined the performance of adsorbents in post-combustion capture processes specific to natural gas flue emissions. Natural gas is the fastest-growing fossil fuel source in terms of worldwide consumption. The growing worldwide consumption of natural gas is due to increasingly available reserves and its low greenhouse gas footprint relative to coal.

The conditions for carbon capture from natural gas are relatively similar to that of carbon capture from coal flue gases. However, there are differences. The flue gas streams are released at atmospheric pressure, are generated at high temperatures (>80° C.) but typically cooled to 40-60° C. to enable effective $CO_2$ capture. While coal flue gas streams typically contain relatively high $CO_2$ concentrations, the typical flue gas from a natural gas combined cycle (NGCC) power plant contains ~4% by vol. $CO_2$, or about 40,000 ppmv $CO_2$, making capture challenging. An additional challenge is that flue gas from natural gas combined cycle (NGCC) power plants also contains other components such oxygen and water.

According to the Intergovernmental Panel on Climate Change (IPCC) the 1.5° C. and 2° C. scenarios show a future need for carbon dioxide removal (CDR) negative emissions technologies such as bioenergy with carbon capture and storage (BECCS) or direct air capture (DAC). DAC is has shown to be very expensive while BECCS requires large areas of arable land competing with agriculture at the same time as the world's population is increasing.

As such, there is a need for adsorbents which are specific to $CO_2$ and maximize $CO_2$ capture.

The most technology-ready materials for CCS applications are aqueous amine solutions due to their low costs, effective performance under humid conditions, and high selectivity for $CO_2$ over $N_2$. For instance, in some such instances, the exhaust from power plants is passed through a fluidized bed of aqueous amine solution. See, Boot-Handford et al., 2014, Energy Environ. Sci. 7, p. 130; Bhown and Freeman, 2011, Environ. Sci. Technol. 45, p. 8624; and Rochelle, 2009, Science 325, p. 1652. However, these sorbents suffer from a number of drawbacks, including low working capacities (~2 wt %), corrosiveness, and thermal degradation upon regeneration of the amine solution. See Boot-Handford, 2014, Fennell, Energy Environ. Sci. 7, p. 130; and Fredriksen and Jens, 2013, Energy Procedia 37, p. 1770; and Gouedard et al., 2012, Int. J. Greenhouse Gas Control, 10, p. 244. In particular, at least on the high volume scale needed for industrial regeneration of $CO_2$ absorbents, aqueous amines to date have been unsatisfactory because of such thermal degradation.

Porous solid adsorbents are also of interest for $CO_2$ adsorbent applications because of their increased stability compared to aqueous amine solutions and potentially lower regeneration energies. See, Drage, 2012, J. Mater. Chem. 22, p. 2815. These favorable properties have led to their investigation as adsorbents for CCS. For selected reviews, see: Lee and Park, 2015, Ind. Eng. Chem. 23, p. 1; Samanta et al., 2012, Ind. Eng. Chem. Res. 51, p. 1438; and Choi et al., 2009, ChemSusChem 2, p. 796. Unfortunately, $CO_2$ adsorption in most of these materials is impaired by the water present in flue gas, which passivates the $CO_2$ binding sites and/or degrades the material. See, Woerner et al., 2016, J. Phys. Chem. C 120, p. 360; Kim et al., 2016, Energy Environ. Sci. 9, p. 1803; Mason et al., 2015, J. Am. Chem. Soc. 137, p. 4787; and Wang and LeVan, 2010, J. Chem. Eng. Data 55, p. 3189.

Amine-functionalized porous solids, such as amine-appended silicas, combine the best of both classes of materials while maintaining high $CO_2/N_2$ selectivities under humid conditions. See, Lee and Park., 2015, Ind. Eng. Chem. 23, p. 1; Samanta et al., 2012, Ind. Eng. Chem. Res. 51, p. 1438; Choi et al., 2009, ChemSusChem 2, p. 796; Kim et al., 2016, Energy Environ. Sci. 9, p. 1803; Mason et al., 2015, J. Am. Chem. Soc. 137, p. 4787; Unveren et al., 2017, Petroleum 3, p. 37; Didas et al., 2014, J. Phys. Chem. Lett. 5, p. 4194; Bacsik et al., 2011, Langmuir 27, p. 11118; Sayari and Belmabkhout, 2010, J. Am. Chem. Soc. 132, p. 6312; Serna-Guerrero et al., 2008, Ind. Eng. Chem. Res. 47, p. 9406. However, one often overlooked drawback of many of these adsorbents is the significant co-adsorption of $H_2O$ upon $CO_2$ adsorption, contributing to parasitic energy costs upon regeneration as water is desorbed from the bed with $CO_2$. See, Mason et al., 2015, J. Am. Chem. Soc. 137, p. 4787; Veneman et al., 2014, Energy Procedia 63, p. 2336; Xu et al., 2005, Ind. Eng. Chem. Res. 44, p. 8113; and Franchi et al., 2005, Ind. Eng. Chem. Res. 44, p. 8007.

Metal-organic frameworks are a class of porous solids consisting of metal nodes connected by polytopic organic linkers that allow for precise control over pore architecture and thus fine-tuning of an adsorbent's properties. See, Zhou et al., 2012, Chem. Rev. 112, p. 673; Furukawa et al., 2013, Science 341, p. 123044; and Eddaoudi et al., 2002, Science 295, p. 469. Many metal-organic frameworks have been evaluated for CCS. For selected reviews, see: Yu et al., 2017, Chem. Rev., (DOI: 10.1021/acs.chemrev.6b0062); Sabouni et al., 2014, Environ. Sci. Pollut. Res. 21, p. 5427; Sumida et al., 2012, Chem. Rev. 112, p. 724; Liu et al., 2012, Greenhouse Gasses Sci. Technol. 2, p. 239; Li et al., 2011, Coord. Chem. Rev. 255, p. 1791; and D'Alessandro et al., 2010, Angew. Chem. Int. Ed., 49, p. 6058.

In particular, amine-functionalized (Sumida et al., 2012, Chem. Rev. 112, p. 724; Lin et al., 2016, RSC Adv. 6, p. 32598; Qiao et al., 2016, Chem. Commun. 52, p. 974; Liao et al., 2016, Chem. Sci. 7, p. 6528; Fracaroli et al., 2014, J. Am. Chem. Soc. 136, p. 8863; Cao et al., 2013, J. Environ. Sci. 25, p. 2081; Montoro et al., 2012, J. Mater. Chem. 22, p. 10155; Liu et al., 2012, Chem. Soc. Rev. 41, p. 2308) metal-organic frameworks are promising for these applications due to their ability to capture $CO_2$ in the presence of water while potentially minimizing water co-adsorption.

Accordingly, what is needed in the art are polyamine metal-organic frameworks, in which the polyamines are grafted to the metal-organic framework by multiple M-N bonds per ligand, that exhibit step-shaped $CO_2$ adsorption profiles, and enable effective capture of $CO_2$ at low partial pressures (e.g., an approximately 40° C. step occurring at or below 15 mbar for $CO_2$ capture from coal flue gas, or at or below 4 mbar at approximately 40° C. for $CO_2$ capture from natural gas flue gas, or at or below 0.4 mbar (400 ppm) at ambient temperature commonly taken as 25° C. for carbon capture from air), at greater than 90% by volume capture of $CO_2$, preferably greater than 99%, and are sufficiently stable to be used in steam based regeneration processes on an industrial scale.

SUMMARY

The present disclosure addresses the above-identified shortcomings by providing tetraamine functionalized materials that have an unexpected improvement in capturing $CO_2$ over the prior art. The resulting tetraamine-appended framework adsorbs $CO_2$ cooperatively, resulting in step-shaped $CO_2$ adsorption profiles. These materials maintain $CO_2$ adsorption steps in the presence of water vapor, and unlike the diamine-appended MOFs, these tetraamine materials are stable to steam, making them highly promising for carbon capture from humid gas streams. In addition, these tetraamine functionalized $Mg_2$(dobpdc) materials are capable of greater than 90% by vol., preferably greater than 99% by vol., $CO_2$ capture. For example, tetraamine functionalized materials can achieve greater than 90% by vol., preferably greater than 99% by vol., $CO_2$ capture from NGCCflue gas streams at a temperature range of 40° C.-60° C., preferably 50° C., resulting in lowering $CO_2$ concentrations to less than about 4,000 ppmv. Generally, these tetraaamine functionalized materials can reduce $CO_2$ concentrations to less than about 15,000 ppmv, preferably to less than 10,000 ppmv, preferably less than 4,000 ppmv, preferably to less than about 2,000 ppmv, more preferably to less than about 400 ppmv, even more preferably to less than about 200 ppmv. These tetraamine functionalized materials have proven to be stable and able to capture $CO_2$ at higher temperatures allowing for targeted $CO_2$ concentration reductions depending on the capture temperature. Thus depending on the exact reduction in $CO_2$ in the emitted gas desired, all that is needed is to adjust the temperature of the process.

These tetraamine functionalized materials exhibit enhanced cooperative $CO_2$ adsorption relative to diamine-appended materials.

One aspect of the present disclosure provides activated absorbents comprising polyamine ligands grafted onto a metal-organic framework and exhibiting step-shaped $CO_2$ adsorption and desorption profiles. Such absorbents have a wide range of technical applications, such as for $CO_2$ capture. The disclosed metal-organic frameworks are composed of polytopic organic linkers coordinated with divalent cations such as Mg, Ca, Mn, Cr, Fe, Co, Ni, Cu, or Zn. In some embodiments the disclosed metal-organic frameworks include two or more different divalent cations (e.g., Mg and Ca). In some embodiments the disclosed metal-organic frameworks include three or more different divalent cations. In some embodiments the disclosed metal-organic frameworks a single type of divalent cation. Examples of the polytopic organic linkers include 4,4'-dioxidobiphenyl-3,3'-dicarboxylate; 4,4"-dioxido-[1,1':4',1"-terphenyl]-3,3"-dicarboxylate; 2,5-dioxidobenzene-1,4-dicarboxylate; and 3,3-dioxidobiphenyl-4,4-dicarboxylate.

Another aspect of the present disclosure provides methods for charging the disclosed absorbents. The disclosed charging methods include grafting polyamine ligands onto a metal-organic framework in an organic solvent to form unactivated adsorbent, followed by subjecting the unactivated adsorbent to an inert stream of gas at a temperature of at least 165° C. or by washing the unactivated adsorbent with a noncoordinating solvent such as toluene at 60-80° C., thereby activating the absorbent.

One aspect of the present disclosure provides an adsorption material comprising a metal-organic framework. The metal-organic framework comprises (i) a plurality of divalent cations and (ii) a plurality of polytopic organic linkers. The adsorption material further comprises a plurality of polyamine ligands. In some non-limiting embodiments, the adsorption material has a polyamine ligand:metal-organic framework divalent cation loading ratio of 0.3 or less to 1 (e.g. 0.25 to 1, meaning one polyamine ligand per four metal sites), 0.4 or less to 1 (e.g., 0.35 to 1), 0.5 or less to 1 (e.g. 0.45 to 1), 0.6 or less to 1 (e.g. 0.50 to 1 meaning one polyamine ligand per two metal sites), (0.7 or less to 1 (e.g. 0.6 to 1), 0.7 or less to 1 (e.g. 0.65 to 1), (0.8 or less to 1 (e.g. 0.75 to 1 meaning three polyamine ligands per four metal sites), or (0.9 or less to 1 (e.g. 0.85 to 1). In some embodiments, the polyamine ligand:metal-organic framework divalent cation loading ratio is some other ratio not referenced above. Each respective polyamine ligand in the plurality of polyamine ligands comprises:

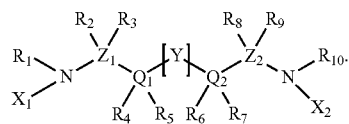

In this formula, $X_1$ and $X_2$ are respective first and second divalent cations in the plurality of divalent cations (e.g., Mg, Ca, Mn, Cr, Fe, Co, Ni, Cu, or Zn). Further, Y is:

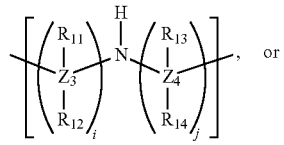

, or

-continued

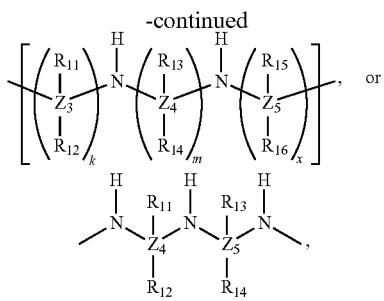

and $Z_1$, $Z_2$, $Z_3$, $Z_4$, $Z_5$, $Q_1$ and $Q_2$ are each independently carbon, silicon, germanium, sulfur, or selenium. The values i, j, k, x, y, and z are each independently 0, 1, or 2, while m is 2, 3, or 4. Each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ is independently H, halogen, substituted or unsubstituted alkyl, substituted or unsubstituted heteroalkyl, substituted or unsubstituted aryl, substituted or unsubstituted heteroaryl, substituted or unsubstituted heterocycloalkyl, substituted or unsubstituted alkoxy, substituted or unsubstituted aryloxy, or substituted or unsubstituted heteroaryloxy.

Another aspect of the present disclosure provides a method for abating $CO_2$ from a flue gas in which the flue gas is contacted with the tetraamine functionalized adsorption material of the present disclosure to reversibly adsorb $CO_2$ from the flue gas, capturing >90% by volume, preferably >99% by volume, $CO_2$ emissions such that the emissions are negative, resulting in direct $CO_2$ capture from the air, thereby generating an adsorption material enriched for $CO_2$ and then stripping a major portion of the $CO_2$ from the adsorption material enriched for $CO_2$ using a temperature swing adsorption method, vacuum swing adsorption method, a pressure swing adsorption method, a concentration swing adsorption method, or a combination thereof.

Another aspect of the present disclosure provides a method for capturing $CO_2$ from air, also known as direct air capture, in which air is contacted with the tetraamine functionalized adsorption material of the present disclosure to reversibly adsorb $CO_2$ from air, capturing >50% by volume, preferable >75% by volume, $CO_2$ emissions, or stated differently, reducing $CO_2$ concentrations in air to less than about 200 ppmv, preferably to less than 100 ppmv, such that the emissions are negative, resulting in direct $CO_2$ capture from the air, thereby generating an adsorption material enriched for $CO_2$. It would be understood by a person of skill in the art that as the base concentration changes, the capture rate also changes. A major portion of the $CO_2$ is then stripped from the adsorption material enriched for $CO_2$ using a temperature swing adsorption method, vacuum swing adsorption method, a pressure swing adsorption method, a concentration swing adsorption method, or a combination thereof.

Another aspect of the present disclosure provides a method for removing $CO_2$ from a biogas. The method comprises contacting the biogas with any adsorption material of the present disclosure to reversibly adsorb $CO_2$ from the biogas thereby generating an adsorption material enriched for $CO_2$ and a residual gas that is greater than 98 percent pure methane. In some such embodiments, the method further comprises stripping a major portion of the $CO_2$ from the adsorption material enriched for $CO_2$ using a temperature swing adsorption method, vacuum swing adsorption method, a pressure swing adsorption method, a concentration swing adsorption method, or a combination thereof.

Another aspect of the present disclosure provides a method for removing $CO_2$ from a hydrocarbon reservoir. The method comprises contacting the hydrocarbon reservoir with any adsorption material of the present disclosure to reversibly adsorb $CO_2$ from the hydrocarbon reservoir thereby generating an adsorption material enriched for $CO_2$. In some such embodiments, the method further comprises stripping a major portion of the $CO_2$ from the adsorption material enriched for $CO_2$ using a temperature swing adsorption method, vacuum swing adsorption method, a pressure swing adsorption method, a concentration swing adsorption method, or a combination thereof.

Still another aspect of the present disclosure provides a method of sequestering carbon dioxide produced by a source. The method comprises exposing the carbon dioxide to an adsorption material of the present disclosure whereby the carbon dioxide is reversibly sequestered into the adsorption material. In some such embodiments, the method further comprises regenerating the adsorption material enriched for $CO_2$ using a temperature swing adsorption method, vacuum swing adsorption method, a pressure swing adsorption method, a concentration swing adsorption method, or a combination thereof.

Another aspect of the present disclosure provides a method of synthesizing an adsorption material in which a plurality of polyamine ligands is grafted onto a metal-organic framework. The metal-organic framework comprises a plurality of divalent cations and a plurality of polytopic organic linkers. The grafting comprises exposing an amount of the metal-organic framework to a solution comprising the polyamine ligand diluted with a solvent thereby forming an unactivated adsorption material. Each polyamine ligand has the formula:

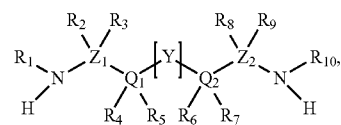

and where Y is:

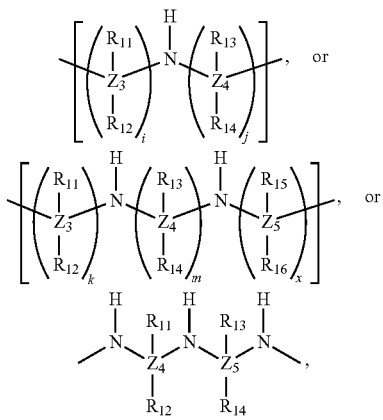

$Z_1$, $Z_2$, $Z_3$, $Z_4$, $Z_5$, $Q_1$ and $Q_2$ are each independently carbon, silicon, germanium, sulfur, or selenium, i, j, k, x, y, and z are each independently 0, 1, or 2, and m is 2, 3, or 4. Further, each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ is independently H, halogen, substituted or unsubstituted alkyl, substituted or unsubstituted heteroalkyl, substituted or unsubstituted aryl, substituted or unsubstituted heteroaryl, substituted or unsubstituted heterocycloalkyl, substituted or unsubstituted alkoxy, substituted or unsubstituted aryloxy, or substituted or unsubstituted heteroaryloxy. In some embodiments, the unactivated adsorption material is subjected to an inert stream of gas at a temperature of at least 165° C., at least 190° C., at least 210° C., or between 190° C. and 250° C., thereby activating the adsorption material. In some embodiments, the unactivated adsorption material is washed with a weakly coordinating or non-coordinating solvent at a temperature of between 60° C. and 180° C. thereby activating the adsorption material. Representative and non-limiting examples of weakly coordinating or non-coordinating solvents can include toluene, chlorobenzene, paraffins, halogenated paraffins, and the like, as well as combinations thereof. In some embodiments, the unactivated adsorption material is placed under a vacuum at a temperature of greater than 60° C. thereby activating the adsorption material. In some embodiments, the unactivated adsorption material is subjected to one or more cycles of (i) an inert stream of gas at a temperature of at least 165° C. followed by (ii) placement under a vacuum at a temperature of greater than 60° C. thereby activating the adsorption material. In some embodiments, the unactivated adsorption material is subjected to a plurality of evacuate-refill cycles, in which an inert gas such as argon or nitrogen, or mixtures thereof is used in the refill cycle. In some embodiments, the unactivated adsorption material is subjected to a plurality of evacuate-refill cycles under elevated temperatures, such as greater than 60° C., in which an inert gas such as argon or nitrogen, or mixtures thereof is used in the refill cycle. In some embodiments, the adsorption material is characterized as activated when it has a polyamine ligand loading of 120 percent or less, where a loading of 100% corresponds to one polyamine ligand per two metal sites.

Referring back to the synthesis of the adsorption material, in some embodiments, the solvent is toluene. In some embodiments, the solvent is toluene, water, methanol, dichloromethane, tetrahydrofuran, cyclohexane, pentane, 2-butanone, trichloroethylene, methyl-t-butyl ether, heptane, diethyl ether, or a mixture thereof. In some embodiments, the inert stream of gas is nitrogen gas, argon gas, or a mixture thereof.

In some embodiments, the activated adsorption material has a polyamine ligand loading of 110 percent or less.

In some embodiments, each divalent cation in the plurality of divalent cations is Mg, Ca, Mn, Cr, Fe, Co, Ni, Cu, or Zn.

Another aspect of the present disclosure provides a method for removing $CO_2$ from a multi-component gas mixture comprising $CO_2$ and at least one of $N_2$, $H_2O$, and $O_2$, the method comprising contacting the multi-component gas mixture with the adsorption material of the present invention reversibly adsorb $CO_2$ from the multi-component gas mixture thereby generating an adsorption material enriched for $CO_2$ and a residual gas that is depleted of $CO_2$ (e.g., less than 10% v/v $CO_2$ remaining in the multi-component gas mixture, less than 5% v/v $CO_2$ remaining in the multi-component gas mixture, less than 2% v/v $CO_2$ remaining in the multi-component gas mixture, less than 1000 ppm at 25° C. in the multi-component gas mixture, less than 500 ppm at 25° C. in the multi-component gas mixture, etc. upon depletion).

DETAILED DESCRIPTION OF THE INVENTION

I. Introduction

Figure 1:
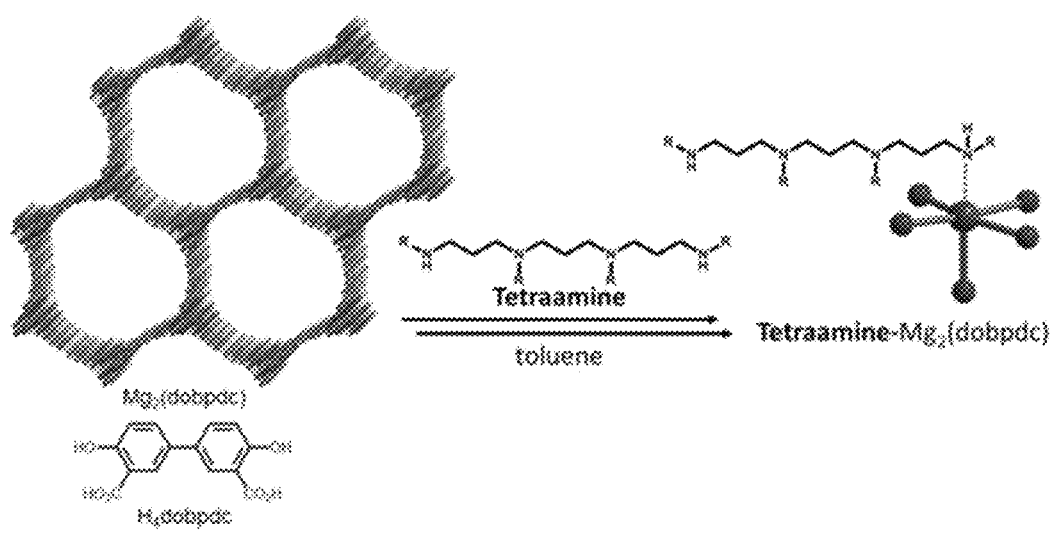
FIG. 1 illustrates a structure of the metal-organic framework $Mg_2$(dobpdc) (dobpdc$^{4-}$=4,4'-dioxidobiphenyl-3,3'-dicarboxylate) (panel A) and appending alkylpropylenetetraamines to the open $Mg^{2+}$ sites of the framework (panel B) to yield adsorbents displaying step-shaped adsorption of $CO_2$.

Herein, a procedure for grafting polyamines (specifically triamines, tetraamines and pentamines) to $Mg_2$(dobpdc) and related metal-organic frameworks via multiple M-N bonds, thereby greatly decreasing amine volatilization, is provided. These polyamines are grafted to the framework and then heated at a critical temperature thereby enabling the formation of the desired adducts possessing multiple M-N bonds per polyamine. The resulting polyamine-appended frameworks adsorb $CO_2$ cooperatively, likely via formation of ammonium carbamate chains, resulting in step-shaped $CO_2$ adsorption profiles. In addition, these materials maintain $CO_2$ adsorption steps in the presence of water vapor, and unlike the diamine-appended MOFs, these polyamine materials are stable to steam, making them highly promising for carbon capture from humid gas streams.

Before the invention is described in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number. All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible. Although any methods and materials similar or equivalent to those described herein may also be used in the practice or testing of the invention, representative illustrative methods and materials are now described.

In describing the present invention, the following terms will be employed, and are defined as indicated below.

II. Definitions

Where substituent groups are specified by their conventional chemical formulae, written from left to right, the structures optionally also encompass the chemically identical substituents, which would result from writing the structure from right to left, e.g., —CH$_2$O— is intended to also optionally recite —OCH$_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. C$_1$-C$_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl." Alkyl groups that are limited to hydrocarbon groups are termed "homoalkyl". Exemplary alkyl groups include the monounsaturated C$_{9-10}$, oleoyl chain or the diunsaturated C$_{9-10, 12-13}$ linoeyl chain.

The term "alkylene" by itself or as part of another substituent means a divalent radical derived from an alkane, as exemplified, but not limited, by —CH$_2$CH$_2$CH$_2$CH$_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The terms "aryloxy" and "heteroaryloxy" are used in their conventional sense, and refer to those aryl or heteroaryl groups attached to the remainder of the molecule via an oxygen atom.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH═CH—O—CH$_3$, —Si(CH$_3$)$_3$, —CH$_2$—CH═N—OCH$_3$, and —CH═CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

The terms "cycloalkyl" and "heterocycloalkyl," by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Further exemplary cycloalkyl groups include steroids, e.g., cholesterol and its derivatives. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl substituent groups (or rings) that contain from one to four heteroatoms selected from N, O, S, Si and B, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes aryl, heteroaryl and heteroarene rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl, and "heteroaryl") are meant to optionally include both substituted and unsubstituted forms of the indicated species. Exemplary substituents for these species are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: H, substituted or unsubstituted aryl, substituted or unsubstituted heteroaryl, substituted or unsubstituted heterocycloalkyl, —OR', =O, =NR', =N—OR', —NR'R", —SR', halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR, —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like). These terms encompass groups considered exemplary "alkyl group substituents," which are components of exemplary "substituted alkyl" and "substituted heteroalkyl" moieties.

Similar to the substituents described for the alkyl radical, substituents for the aryl heteroaryl and heteroarene groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$, —R', —N$_3$, —CH(Ph)$_2$, fluoro($C_1$-$C_4$)alkoxy, and fluoro($C_1$-$C_4$)alkyl, in a number ranging from zero to the total number of open valences on the aromatic ring system. Each of the above-named groups is attached to the heteroarene or heteroaryl nucleus directly or through a heteroatom (e.g., P, N, O, S, Si, or B); and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'" and R"" groups when more than one of these groups is present.

Two of the substituents on adjacent atoms of the aryl, heteroarene or heteroaryl ring may optionally be replaced with a substituent of the formula T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl, heteroarene or heteroaryl ring may optionally be replaced with a substituent of the formula —(CRR')$_s$—X—(CR"R'")$_d$—, where s and d are independently integers of from 0 to 3, and X is —O—, —NR'—, —S—, —S(O)—, —S(O)₂—, or —S(O)₂NR'—. The substituents R, R', R" and R'" are preferably independently selected from hydrogen or substituted or unsubstituted ($C_1$-$C_6$) alkyl. These terms encompass groups considered exemplary "aryl group substituents", which are components of exemplary "substituted aryl" "substituted heteroarene" and "substituted heteroaryl" moieties.

As used herein, the term "acyl" describes a substituent containing a carbonyl residue, C(O)R. Exemplary species for R include H, halogen, substituted or unsubstituted alkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non-aromatic rings. Examples of "fused ring systems" are naphthalenes, indoles, quinolines, chromenes and the like.

As used herein, the term "heteroatom" includes oxygen (O), nitrogen (N), sulfur (S) and silicon (Si), boron (B) and phosphorous (P).

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

The compounds disclosed herein may also contain unnatural proportions of atomic isotopes at one or more of the atoms that constitute such compounds. For example, the compounds may be radiolabeled with radioactive isotopes, such as for example tritium ($^3H$), iodine-125 ($^{125}I$) or carbon-14 ($^{14}C$). All isotopic variations of the compounds of the present invention, whether radioactive or not, are intended to be encompassed within the scope of the present invention.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present invention contain both basic and acidic functionalities that allow the compounds to be converted into either base or acid addition salts. Hydrates of the salts are also included.

"—COOH" as this term is used refers to is meant to optionally include —C(O)O⁻ and —C(O)O⁻X⁺, wherein X⁺ is a cationic counter-ion. Likewise, a substituent having the formula N(R)(R) is meant to optionally include —N⁺H(R)(R) and —N⁺H(R)(R)Y⁻, wherein Y⁻ represents an anionic counter-ion. Exemplary polymers of the invention include a protonated carboxylic moiety (COOH). Exemplary polymers of the invention include a deprotonated carboxylic moiety (COO⁻). Various polymers of the invention include both a protonated carboxylic moiety and a deprotonated carboxylic moiety.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure or be stereoisomeric mixtures. In addition it is understood that, in any compound described herein having one or more double bond(s) generating geometrical isomers that can be defined as E or Z, each double bond may independently be E or Z a mixture thereof. Likewise, it is understood that, in any compound described, all tautomeric forms are also intended to be included.

Below are examples of specific embodiments of the present disclosure. The examples are offered for illustrative purposes only, and are not intended to limit the scope of the present invention in any way.

III. Compositions

One aspect of the present disclosure provides an adsorption material comprising a metal-organic framework. The metal-organic framework comprises (i) a plurality of divalent cations and (ii) a plurality of polytopic organic linkers. The adsorption material further comprises a plurality of polyamine ligands. In some embodiments, the adsorption material has a polyamine ligand:metal-organic framework divalent cation loading ratio of 0.3 or less to 1 (e.g. 0.25 to 1, meaning one polyamine ligand per four metal sites), 0.4 or less to 1 (e.g., 0.35 to 1), 0.5 or less to 1 (e.g. 0.45 to 1), 0.6 or less to 1 (e.g. 0.50 to 1 meaning one polyamine ligand per two metal sites), (0.7 or less to 1 (e.g. 0.6 to 1), 0.7 or less to 1 (e.g. 0.65 to 1), (0.8 or less to 1 (e.g. 0.75 to 1 meaning three polyamine ligands per four metal sites), or (0.9 or less to 1 (e.g. 0.85 to 1). In some embodiments, the polyamine ligand:metal-organic framework divalent cation loading ratio is some other ratio not referenced above. Each respective polyamine ligand in the plurality of polyamine ligands comprises:

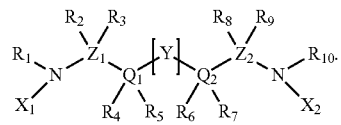

In this formula, $X_1$ and $X_2$ are respective first and second divalent cations in the plurality of divalent cations (e.g., Mg, Ca, Mn, Cr, Fe, Co, Ni, Cu, or Zn). Further, Y is:

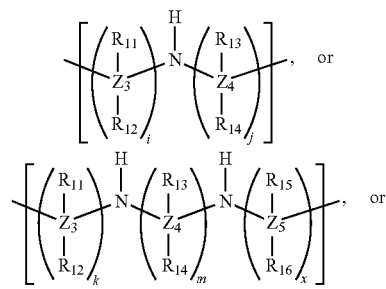

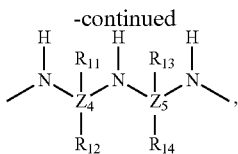

and $Z_1$, $Z_2$, $Z_3$, $Z_4$, $Z_5$, $Q_1$ and $Q_2$ are each independently carbon, silicon, germanium, sulfur, or selenium. The values i, j, k, x, y, and z are each independently 0, 1, or 2, while m is 2, 3, or 4. Each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ is independently H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl, substituted or unsubstituted alkoxy, substituted or unsubstituted aryloxy, or substituted or unsubstituted heteroaryloxy.

In some embodiments, at least twenty percent, in at least forty percent, in at least sixty percent, in at least eighty percent, or at least ninety-eight percent of the plurality of polyamine ligands are each (i) amine appended by a first amine of the respective polyamine ligand to a first divalent cation in the plurality of divalent cations and (ii) amine appended by a second amine of the respective polyamine ligand to a second divalent cation in the plurality of divalent cations of the metal-organic framework In some embodiments, Y is:

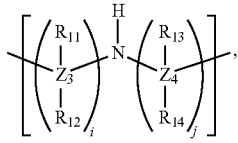

and (a) i and j are each zero, (b) i is one and j is zero, (c) i is one and j is one, or (d) i is one and j is two.

An example of such embodiments where i is one and j is zero is:

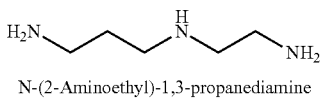

N-(2-Aminoethyl)-1,3-propanediamine

In the case of N-(2-Aminoethyl)-1,3-propanediamine, $Z_1$, $Z_2$, $Z_3$, $Q_1$ and $Q_2$ are each carbon, i is one, j is zero, and $R_1$, $R_2$, $R_3$, $R_4$, $R_5$, $R_6$, $R_7$, $R_8$, $R_9$, $R_{10}$, $R_{11}$ and $R_{12}$ are each hydrogen.

Alternatively, in some embodiments, Y is:

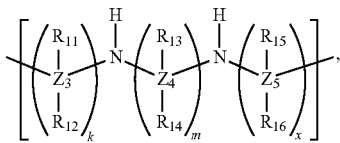

and k and x are zero, and m is two or three. An example of such embodiments is:

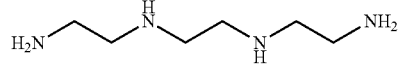

N,N'-(ethane-1,2-diyl)bis(ethane-1,2-diamine) (2-2-2)

In the case of triethylenetetraamine, $Z_1$, $Z_2$, $Z_4$, $Q_1$ and $Q_2$ are each carbon, k is zero, x is zero, $R_1$, $R_2$, $R_3$, $R_4$, $R_5$, $R_6$, $R_7$, $R_8$, $R_9$, and $R_{10}$, are each hydrogen, each instance of the two instances of $R_{13}$ and $R_{14}$ is hydrogen, and m is two.

Alternatively, in some embodiments, Y is:

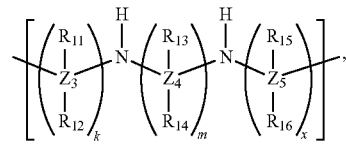

k and x are each one, and m is two, three or four.
An example of such embodiments is:

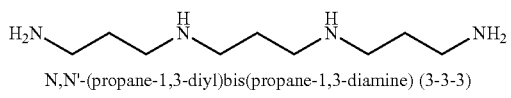 [SMILES: NCCCNCCCNCCCN]

N,N'-(propane-1,3-diyl)bis(propane-1,3-diamine) (3-3-3)

In the case of N,N'-bis(3-aminopropyl)-1,3-propanediamine, $Z_1$, $Z_2$, $Z_3$, $Z_4$, $Z_5$, $Q_1$ and $Q_2$ are each carbon, k is one, x is one, $R_1$, $R_2$, $R_3$, $R_4$, $R_5$, $R_6$, $R_7$, $R_8$, $R_9$, $R_{10}$, $R_{11}$, $R_{12}$, $R_{15}$, and $R_{16}$ are each hydrogen, each instance of the three instances of $R_{13}$ and $R_{14}$ is hydrogen, and m is three. Another example of such embodiments is:

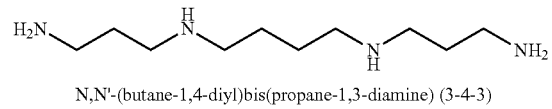 [SMILES: NCCCNCCCCNCCCN]

N,N'-(butane-1,4-diyl)bis(propane-1,3-diamine) (3-4-3)

In the case of N,N'-bis(3-aminopropyl)-1,4-diaminobutane, $Z_1$, $Z_2$, $Z_3$, $Z_4$, $Z_5$, $Q_1$ and $Q_2$ are each carbon, k is one, x is one, $R_1$, $R_2$, $R_3$, $R_4$, $R_5$, $R_6$, $R_7$, $R_8$, $R_9$, $R_{10}$, $R_{11}$, $R_{12}$, $R_{15}$, and $R_{16}$ are each hydrogen, each instance of the four instances of $R_{13}$ and $R_{14}$ is hydrogen, and m is four.

In some embodiments, $Z_1$, $Z_2$, $Z_3$, $Z_4$, $Z_5$, $Q_1$ and $Q_2$ are each independently carbon. In some embodiments, each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ is independently H, halogen, substituted or unsubstituted n-alkyl or a substituted or unsubstituted branched-chain alkyl. In some such embodiments, each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ is H.

In some embodiments, the polytopic organic linker is 4,4'-dioxidobiphenyl-3,3'-dicarboxylate (dobpdc$^{4-}$), 4,4"-dioxido-[1,1':4',1"-terphenyl]-3,3"-dicarboxylate (dotpdc$^{4-}$), 2,5-dioxidobenzene-1,4-dicarboxylate (dobdc$^{4-}$), or 3,3' dioxide-biphenyl-4,4'-dicarboxylate (para-carboxylate-dobpdc$^{4-}$).

In some embodiments, each polyamine ligand in the plurality of polyamine ligands is: triethylenetetraamine, N,N'-bis(3-aminopropyl)-1,3-propanediamine (referred to herein as "3-3-3"), N,N'-bis(3-aminopropyl)-1,4-diaminobutane (referred to herein as "3-4-3").

By way of example, the polyamine ligands can be

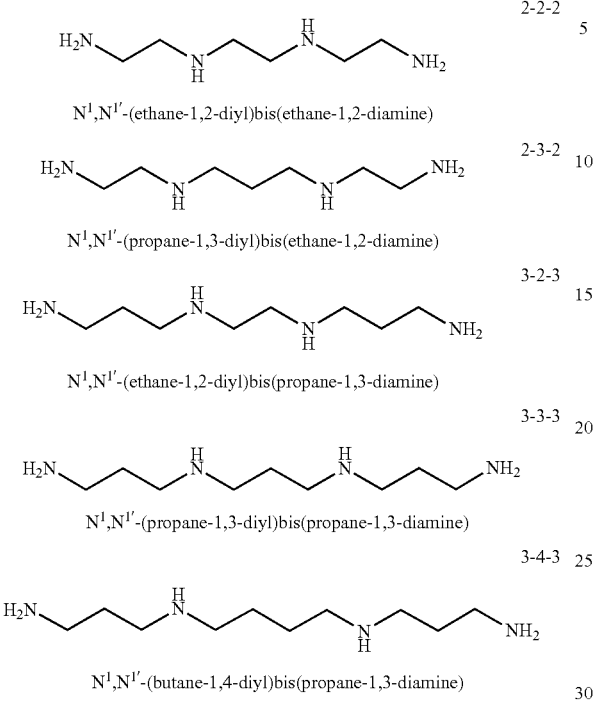

In some embodiments, the loading of the plurality of polyamine ligands to the metal-organic framework is between 5 percent and 500 percent, 20 percent and 250 percent, 25 percent and 200 percent, 80 percent and 120 percent, between 90 percent and 110 percent, between 95 percent and 105 percent, or between 98 percent and 102 percent.

In some embodiments, the adsorption material exhibits a step-shaped $CO_2$ adsorption profile. In some embodiments, the adsorption material exhibits a step-shaped $CO_2$ desorption profile. In some embodiments, the adsorption material exhibits a single step-shaped $CO_2$ adsorption profile. In some embodiments, the adsorption material exhibits a single step-shaped $CO_2$ desorption profile.

In some embodiments, the polytopic organic linker is an analog of $(dobpdc^{4-})$, having the formula:

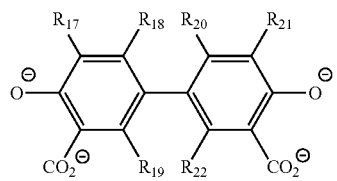

where $R_{17}$, $R_{18}$, $R_{19}$, $R_{20}$, $R_{21}$, and $R_{22}$, are each independently selected from H, halogen, hydroxyl, methyl, and halogen substituted methyl.

In some embodiments, the polytopic organic linker is an analog of $(dotpdc^{4-})$ having the formula:

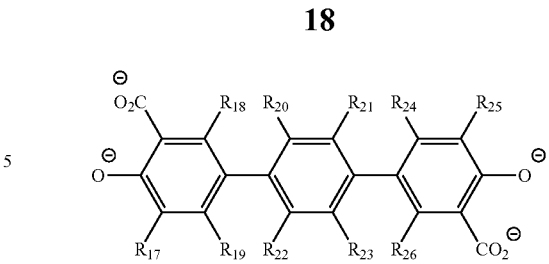

where $R_{17}$, $R_{18}$, $R_{19}$, $R_{20}$, $R_{21}$, $R_{22}$, $R_{23}$, $R_{24}$, $R_{25}$, and $R_{26}$, are each independently selected from H, halogen, hydroxyl, methyl, and halogen substituted methyl.

In some embodiments, the polytopic organic linker is an analog of $(pc\text{-}dobpdc^{4-})$ having the formula:

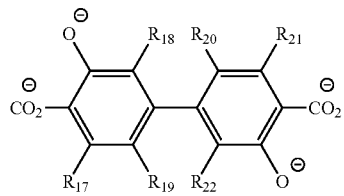

where $R_{17}$, $R_{18}$, $R_{19}$, $R_{20}$, $R_{21}$, and $R_{22}$, are each independently selected from H, halogen, hydroxyl, methyl, and halogen substituted methyl.

In some embodiments, the polytopic organic linker has the formula:

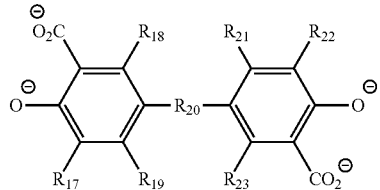

where $R_{17}$, $R_{18}$, $R_{19}$, $R_{21}$, $R_{22}$, and $R_{23}$ are each independently selected from H, halogen, hydroxyl, methyl, and halogen substituted methyl, and $R_{20}$ is selected from substituted or unsubstituted aryl, and substituted or unsubstituted heteroaryl.

IV. Synthetic Methods

Another aspect of the present disclosure provides a method of synthesizing an adsorption material in which a plurality of polyamine ligands is grafted onto a metal-organic framework. The metal-organic framework comprises a plurality of divalent cations and a plurality of polytopic organic linkers. The grafting comprises exposing an amount of the metal-organic framework to a solution comprising the polyamine ligand diluted with a solvent thereby forming an unactivated adsorption material.

In some embodiments, adsorption material is prepared by a method in which the metal-organic framework is optionally first heated (e.g. at 160° C. under vacuum condition or under flowing $N_2$ or Ar for 12 hours), removing adsorbed water and coordinated water or other coordinating solvents. Then the metal-organic framework is dissolved in a solution comprising anhydrous organic solvent charged with the polyamine thereby forming unactivated adsorption material.

In some embodiments, the solution is 20% (v/v) polyamine to anhydrous organic solvent. In some embodiments, the solution is between 10% (v/v) and 40% (v/v) polyamine to anhydrous organic solvent. In some embodiments the polyamine is dissolved into the anhydrous organic solvent on an equivalent (w/w) basis rather than a (v/v) basis. In some embodiments, the resulting product is dried for three hours or more under nitrogen protection.

In some embodiments, each polyamine ligand has the formula:

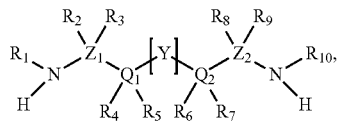

and where Y is:

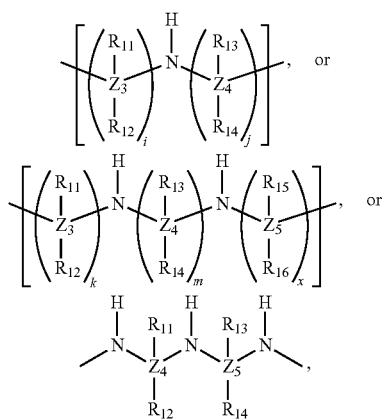

$Z_1$, $Z_2$, $Z_3$, $Z_4$, $Z_5$, $Q_1$ and $Q_2$ are each independently carbon, silicon, germanium, sulfur, or selenium, i, j, k, x, y, and z are each independently 0, 1, or 2, and m is 2, 3, or 4. Further, each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ is independently H, halogen, substituted or unsubstituted alkyl, substituted or unsubstituted heteroalkyl, substituted or unsubstituted aryl, substituted or unsubstituted heteroaryl, substituted or unsubstituted heterocycloalkyl, substituted or unsubstituted alkoxy, substituted or unsubstituted aryloxy, or substituted or unsubstituted heteroaryloxy.

In some embodiments, the unactivated adsorption material is subjected to an inert stream of gas at a temperature of at least 165° C. thereby activating the adsorption material.

In some alternative embodiments, the unactivated adsorption material is washed with a weakly coordinating or non-coordinating solvent at a temperature of between 60° C. and 80° C. at least 165° C. thereby activating the adsorption material. Representative and non-limiting examples of weakly coordinating or non-coordinating solvents can include toluene, chlorobenzene, paraffins, halogenated paraffins, and the like, as well as combinations thereof.

In some alternative embodiments, the unactivated adsorption material is placed under a vacuum at a temperature of greater than 60° C. thereby activating the adsorption material.

In some alternative embodiments, the unactivated adsorption material is subjected to one or more cycles of (i) an inert stream of gas at a temperature of at least 165° C. followed by (ii) placement under a vacuum at a temperature of greater than 60° C. thereby activating the adsorption material.

In some alternative embodiments, the unactivated adsorption material is subjected to a plurality of evacuate-refill cycles, in which an inert gas such as argon or nitrogen, or mixtures thereof is used in the refill cycle, thereby activating the adsorption material.

In some alternative embodiments, the unactivated adsorption material is subjected to a plurality of evacuate-refill cycles under elevated temperatures, such as greater than 60° C., in which an inert gas such as argon or nitrogen, or mixtures thereof is used in the refill cycle thereby activating the adsorption material.

In some embodiments, the adsorption material is characterized as activated when it has a polyamine ligand loading of 120 percent or less. In some embodiments, each divalent cation in the plurality of divalent cations is Mg, Ca, Mn, Cr, Fe, Co, Ni, Cu, or Zn.

In some embodiments, the solvent is anhydrous. In some embodiments, the solvent is toluene. In some embodiments, the solvent is toluene, methanol, dichloromethane, tetrahydrofuran, cyclohexane, pentane, 2-butanone, trichloroethylene, methyl-t-butyl ether, heptane, diethyl ether, or a mixture thereof. In some embodiments, the inert stream of gas is an argon or nitrogen gas, or a mixture thereof.

In the disclosed methods, the unactivated adsorption material from the wet impregnation method is then subjected to an inert environment at a temperature of at least 165° C. thereby activating the adsorption material. In some such embodiments, the activated adsorption material has a polyamine ligand loading of 120 percent or less. In some embodiments, the activated adsorption material has a polyamine ligand loading of 110 percent or less. In some embodiments, the unactivated adsorption material from the wet impregnation method is subjected to an inert environment at a temperature of at least 190° C., at least 210° C., or between 190° C. and 250° C.

In some embodiments, the unactivated adsorption material is subjected to the inert environment at the temperature of at least 165° C. for at least four hours, for at least six hours, for at least eight hours, or at least twelve hours, thereby activating the adsorption material.

V. Technical Applications

In one aspect of the present disclosure, there is provided a number of technical applications for the disclosed adsorption materials.

One such application is carbon capture from powerplant exhaust, such as coal flue gas. The increasing atmospheric levels of carbon dioxide ($CO_2$), which are likely contributing to global climate change, warrant new strategies for reducing $CO_2$ emissions from point sources such as power plants. In particular, coal-fueled power plants are responsible for 46% of global anthropogenic energy supply $CO_2$ emissions. See, "$CO_2$ Emissions From Fuel Combustion Highlights," 2016 Edition, International Energy Agency, Paris, France, which is hereby incorporated by reference. Thus, there remains a continuing need for the development of new adsorbents for carbon capture from coal flue gas, a gas stream consisting of $CO_2$ (15-16%), $O_2$ (3-4%), $H_2O$ (5-7%), $N_2$ (70-75%), and trace impurities (e.g. $SO_2$, $NO_x$) at ambient pressure and 40° C. See, Planas et al., 2013, "The Mechanism of Carbon Dioxide Adsorption in an Alkylamine-Functionalized Metal-Organic Framework," J. Am. Chem. Soc. 135, pp. 7402-7405, which is hereby incorporated by reference. In particular, for a temperature swing adsorption process, an adsorbent should possess the following properties: (a) a high working capacity with a minimal temperature swing, in order to minimize regeneration energy costs; (b) high selectivity for $CO_2$ over the other constituents of coal flue gas; (c) 90% capture of $CO_2$ under flue gas conditions; (d) effective performance under humid conditions; and (d) long-term stability to adsorption/desorption cycling under humid conditions.

Another such application is carbon capture from a biogas such as crude biogas, natural gas, or landfill gas. Biogas, for instance the $CO_2/CH_4$ mixtures produced by the breakdown of organic matter, is a renewable fuel source with the potential to replace traditional fossil fuel sources. Removal of $CO_2$ from crude biogas mixtures is one of the most challenging aspects of upgrading this promising fuel source to pipeline quality methane. Therefore, for example, the use of adsorbents to selectively remove $CO_2$ from high pressure $CO_2/CH_4$ mixtures with a high working capacity and minimal regeneration energy has the potential to greatly reduce the cost of using biogas in place of natural gas for applications in the energy sector. Some embodiments of the present disclosure provide a method that comprises contacting a biogas, natural gas, landfill gas, or non-renewable gas comprising $CO_2$ and $CH_4$ with any adsorption material of the present disclosure to reversibly adsorb $CO_2$ from the gas thereby generating an adsorption material enriched for $CO_2$ and a residual gas that is greater than 80 percent pure methane, 90 percent pure methane, or 98 percent pure methane. In some such embodiments, the method further comprises stripping a major portion of the $CO_2$ from the adsorption material enriched for $CO_2$ using a temperature swing adsorption method, vacuum swing adsorption method, a pressure swing adsorption method, a concentration swing adsorption method, or a combination thereof.

The disclosed compositions (adsorption materials) can be used to strip a major portion of the $CO_2$ from the adsorption material enriched for $CO_2$ using a temperature swing adsorption method or a vacuum swing adsorption method. Example temperature swing adsorption methods and vacuum swing adsorption methods are disclosed in International Publication Number WO2013/059527 A1, which is hereby incorporated by reference.

Another aspect of the present disclosure provides a method for abating $CO_2$ from a flue gas, such as natural gas flue gas. In such embodiments, the flue gas is contacted with any adsorption material of the present disclosure to reversibly adsorb $CO_2$ from the flue gas thereby generating an adsorption material enriched for $CO_2$ and then stripping a major portion of the $CO_2$ from the adsorption material enriched for $CO_2$ using a using a temperature swing adsorption method, vacuum swing adsorption method, a pressure swing adsorption method, a concentration swing adsorption method, or a combination thereof.

Another other aspect of the present disclosure provides air capture methods in which excess $CO_2$ in the atmosphere is reduced in order to address $CO_2$ contribution from mobile sources such as automobile and airplane emissions for abating $CO_2$ from a flue gas, such as natural gas flue gas. In some such embodiments, atmospheric air is contacted with any adsorption material of the present disclosure to reversibly adsorb $CO_2$ from the air thereby generating an adsorption material enriched for $CO_2$ and then stripping a major portion of the $CO_2$ from the adsorption material enriched for $CO_2$ using a using a temperature swing adsorption method, vacuum swing adsorption method, a pressure swing adsorption method, a concentration swing adsorption method, or a combination thereof.

Still another aspect of the present disclosure provides a method of sequestering carbon dioxide produced by a source. The method comprises exposing the carbon dioxide to an adsorption material of the present disclosure whereby the carbon dioxide is reversibly sequestered into the adsorption material. In some embodiments, the method further comprises regenerating the adsorption material enriched for $CO_2$ using a temperature swing adsorption method, vacuum swing adsorption method, a pressure swing adsorption method, a concentration swing adsorption method, or a combination thereof.

Still another aspect of the present disclosure provides a method of sequestering carbon dioxide from a multi-component gas mixture. In some such embodiments the multi-component gas mixture comprises $CO_2$ and at least one of $N_2$, $H_2O$, and $O_2$. The method comprises exposing the multi-component gas mixture to an adsorption material of the present disclosure whereby a least fifty percent, at least sixty percent, or at least eighty percent of the carbon dioxide within the multi-component gas mixture is reversibly sequestered into the adsorption material. In some such embodiments, the method further comprises regenerating the adsorption material enriched for $CO_2$ using a temperature swing adsorption method, vacuum swing adsorption method, a pressure swing adsorption method, a concentration swing adsorption method, or a combination thereof.

Another aspect of the present disclosure provides a method of capturing $CO_2$ emissions using a combination of the tetraamine functionalized materials disclosed herein with known $CO_2$ capture technologies such as liquid absorbents in process configurations such as those disclosed in Feron, P. et al., "Towards Zero Emissions from Fossil Fuel Power Stations", International Journal of Greenhouse Gas Control 87 (2019) 188-902, hereby incorporated by reference, and separation processes, such as cryogenics, which involve the separation and the simultaneous solidification of $CO_2$ from a gaseous mixture. See U.S. Pat. No. 2,011,550 to Hasche.

VI. Examples

Synthesis of Tetraamine-Appended $Mg_2$(dobpdc)

The following procedure was used for each tetraamine analogue, 3-4-3 and 3-3-3. A 20 mL scintillation vial was charged with a 20% v/v solution of amine in toluene. Separately, approximately 20 mg of methanol-solvated $Mg_2$(dobpdc) was filtered from the methanol mother liquor and washed with toluene (3×10 mL). After the toluene washes and subsequent drying on the filter for 2 min under vacuum, $Mg_2$(dobpdc) was added to the tetraamine solution and the vial was left at room temperature for 24 h (60° C. for 24 h in the case of 3-4-3). After soaking, the mixture was filtered and washed with toluene (3×10 mL). Tetraamine-appended $Mg_2$(dobpdc) was recovered as an off-white powder after 2 minutes of drying on the filter. To achieve desired 1:2 tetraamine:metal ratio, the as-synthesized material was then heated at 225° C. (for 3-3-3) while under flowing $N_2$ for 1 h.

FIG. 1 illustrates a structure of the metal-organic framework $Mg_2$(dobpdc) (dobpdc4−=4,4'-dioxidobiphenyl-3,3'-dicarboxylate) (panel A) and appending alkylpropylenetetraamines to the open $Mg^{2+}$ sites of the framework (panel B) to yield adsorbents displaying step-shaped adsorption of $CO_2$.

Figure 2:
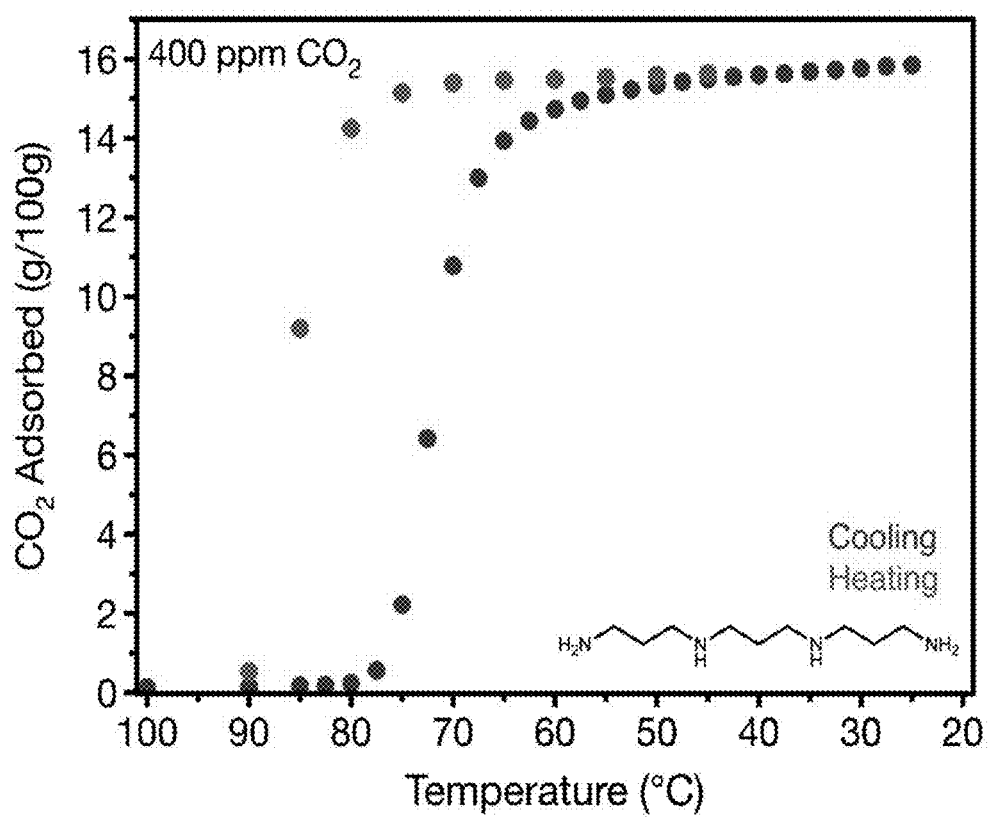
FIG. 2 depicts the $CO_2$ isobar showing how the N,N'-(propane-1,3-diyl)bis(propane-1,3-diamine) ("3-3-3") $Mg_2$(dobpdc) MOF can capture ~16 wt. % $CO_2$ from simulated air (400 ppm $CO_2$) at temperatures below 60° C.

FIG. 2 depicts the $CO_2$ isobar showing how the N,N'-(propane-1,3-diyl)bis(propane-1,3-diamine) ("3-3-3")-$Mg_2$ (dobpdc) MOF can capture ~16 wt. % $CO_2$ from simulated air (400 ppm $CO_2$) at temperatures below 60° C.

Figure 3:
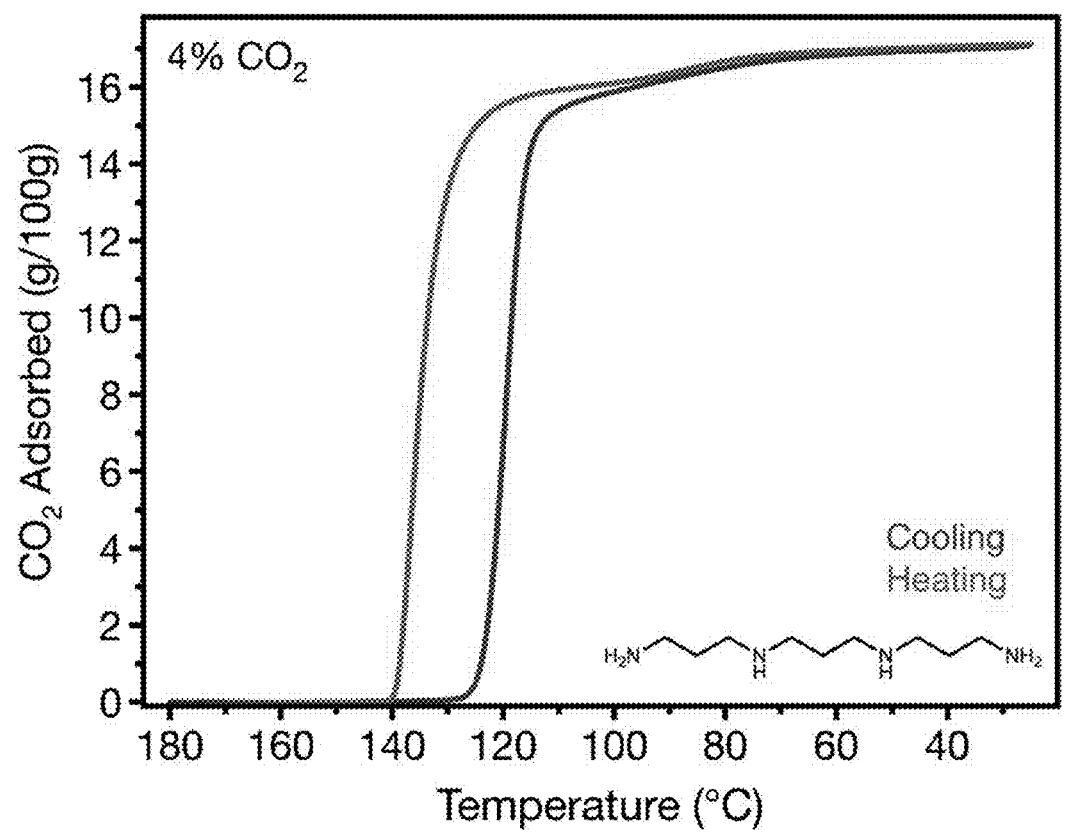
FIG. 3 depicts the $CO_2$ isobar showing how the N,N'-(propane-1,3-diyl)bis(propane-1,3-diamine) ("3-3-3") $Mg_2$(dobpdc) MOF can capture ~16 wt. % $CO_2$ from simulated NGCC flue gas (4% $CO_2$) at temperatures below 110° C.

FIG. 3 depicts the $CO_2$ isobar showing how the N,N'-(propane-1,3-diyl)bis(propane-1,3-diamine) ("3-3-3")-$Mg_2$(dobpdc) MOF can capture ~16 wt. % $CO_2$ from simulated NGCC flue gas (4% $CO_2$) at temperatures below 110° C.

Figure 4:
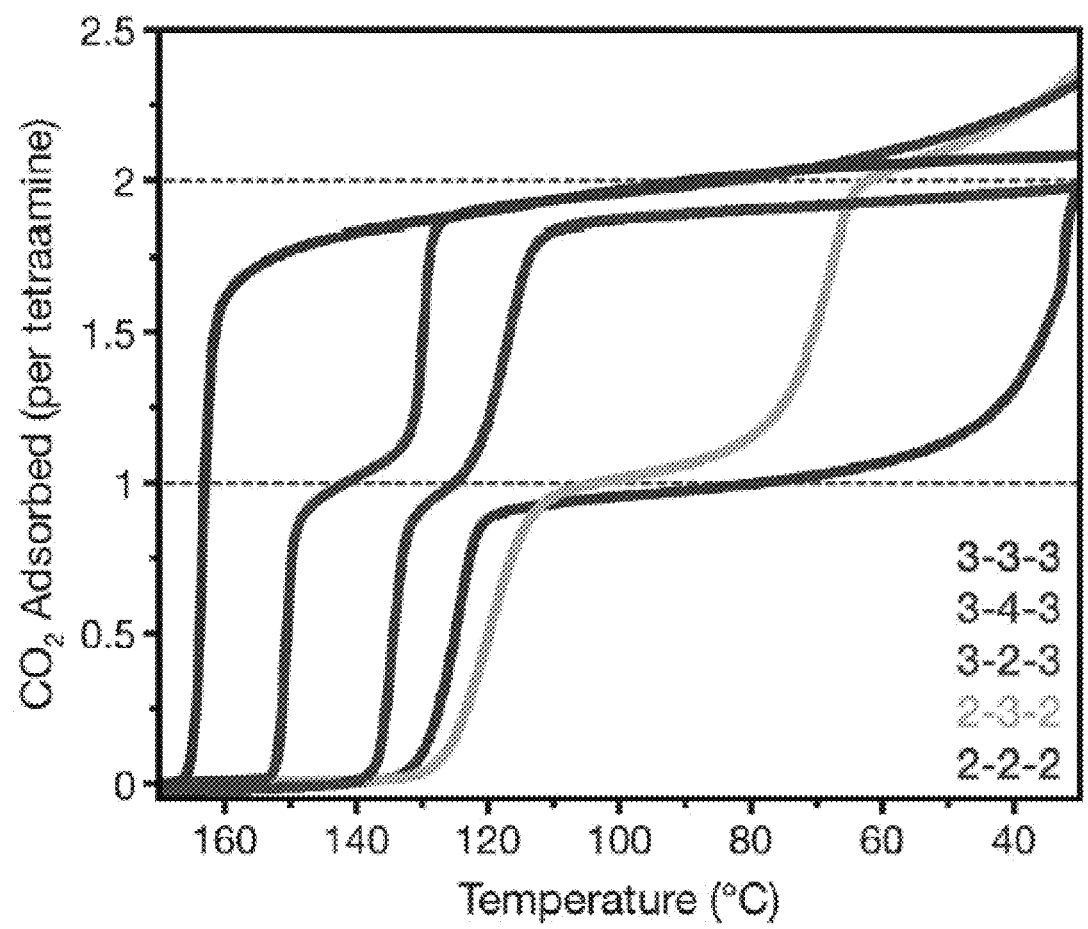
FIG. 4 illustrates the two-step adsorption profile for $Mg_2$(dobpdc) tetraamine MOF variants: N,N'-(propane-1,3-diyl)bis(propane-1,3-diamine) ("3-3-3"); N,N'-(butane-1,4-diyl)bis(propane-1,3-diamine) ("3-4-3"); N,N'-(ethane-1,2-diyl)bis(propane-1,3-diamine) ("3-2-3"); N,N'-(propane-1,3-diyl)bis(ethane-1,2-diamine) ("2-3-2"); and N,N'-(ethane-1,2-diyl)bis(ethane-1,2-diamine) ("2-2-2").

FIG. 4 illustrates the two-step adsorption profile for $Mg_2$(dobpdc) tetraaamine MOF variants: N,N'-(propane-1,3-diyl)bis(propane-1,3-diamine) ("3-3-3") (single-step); N,N'-(butane-1,4-diyl)bis(propane-1,3-diamine) ("3-4-3"); N,N'-(ethane-1,2-diyl)bis(propane-1,3-diamine) ("3-2-3"); N,N'-(propane-1,3-diyl)bis(ethane-1,2-diamine) ("2-3-2"); and N,N'-(ethane-1,2-diyl)bis(ethane-1,2-diamine) ("2-2-2").

CONCLUSION

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:

1. A method for reducing carbon dioxide emissions, the method comprising:
(a) contacting a flue gas from a source with a carbon dioxide adsorbing material to reversibly adsorb $CO_2$ from the flue gas thereby generating an adsorption material enriched for $CO_2$;
(b) reducing the concentration of $CO_2$ from the flue gas to less than 15,000 ppmv; and,
(c) stripping a portion of the $CO_2$ from the adsorption material enriched for $CO_2$ using a regeneration process,
wherein the carbon dioxide adsorbing material comprises a tetraamine functionalized metal organic framework.

2. The method of claim 1, wherein the tetraamine functionalized metal organic framework comprises a plurality of divalent cations and a plurality of polytopic organic linkers.

3. The method of claim 2, wherein each divalent cation in the plurality of divalent cations is Mg, Ca, Mn, Cr, Fe, Co, Ni, Cu, Zn or a combination thereof.

4. The method of claim 3 wherein the divalent cation in the plurality of divalent cations is Mg.

5. The method of claim 2, wherein the plurality of polytopic organic linkers comprise 4,4'-dioxidobiphenyl-3,3'-dicarboxylate (dobpdc$^{4-}$), 4,4"-dioxido-[1,1':4',1"-terphenyl]-3,3"-dicarboxylate (dotpdc$^{4-}$), 2,5-dioxidobenzene-1,4-dicarboxylate (dobdc$^{4-}$), or 3,3' dioxide-biphenyl-4,4'-dicarboxylate (para-carboxylate-dobpdc$^{4-}$).

6. The method of claim 2, wherein the tetraamine functionalized metal organic framework comprises N,N'-(propane-1,3-diyl)bis(propane-1,3-diamine); N,N'-(butane-1,4-diyl)bis(propane-1,3-diamine); N,N'-(ethane-1,2-diyl)bis(propane-1,3-diamine); N,N'-(propane-1,3-diyl)bis(ethane-1,2-diamine); or N,N'-(ethane-1,2-diyl)bis(ethane-1,2-diamine).

7. The method of claim 6, wherein the tetraamine functionalized metal organic framework comprises N,N'-(propane-1,3-diyl)bis(propane-1,3-diamine) or N,N-(butane-1,4-diyl)bis(propane-1,3-diamine).

8. The method of claim 1, wherein the source is a natural gas combined cycle (NGCC) power plant and $CO_2$ in the flue gas is reduced to a concentration of less than 2,000 ppmv.

9. The method of claim 8, wherein $CO_2$ in the flue gas is reduced to concentration of less than 400 ppmv.

10. The method of claim 1, wherein the concentration of $CO_2$ from the flue gas is reduced to less than 10,000 ppmv.

11. The method of claim 1, wherein the concentration of $CO_2$ from the flue gas is reduced to less than 4,000 ppmv.

12. The method of claim 1, wherein the regeneration process comprises a temperature swing adsorption method, a vacuum swing adsorption method, a pressure swing adsorption method, a concentration swing adsorption method, or a combination thereof.

13. The method of claim 1, wherein the regeneration process comprises applying steam to the adsorption material enriched for $CO_2$ thereby reactivating the adsorption material.

14. A method for $CO_2$ direct air capture, the method comprising:
contacting air with a carbon dioxide adsorption material to reversibly adsorb $CO_2$ from the air thereby generating an adsorption material enriched for $CO_2$ and reducing $CO_2$ concentrations to less than 400 ppmv,
wherein the carbon dioxide adsorbing material comprises a tetraamine functionalized metal organic framework.

15. The method of claim 14, wherein the tetraamine functionalized metal organic framework comprises a plurality of polytopic organic linkers comprising 4,4'-dioxidobiphenyl-3,3'-dicarboxylate (dotpdc4−), 4,4"-dioxido-[1,1':4',1"-terphenyl]-3,3"-dicarboxylate (dotpdc4−), 2,5-bioxidobenzene-1,4dicarboxylate (dobdc4−), or 3,3' dioxide-biphenyl-4,4'-dicarboxylate (para-carboxylate-dobpdc4−) and the tetraamine functionalized metal organic framework further comprises N,N'-(propane-1,3-diyl)bis(propane-1,3-diamine); N,N'-(butane-1,4-diyl)bis(propane-1,3-diamine); N,N'-(ethane-1,2-diyl)bis(propane-1,3-diamine); N,N'-(propane-1,3-diyl)bis(ethane-1,2-diamine); or N,N'-(ethane-1,2-diyl)bis(ethane-1,2-diamine) and wherein $CO_2$ in the flue gas is reduced to concentration of less than 400 ppmv.

* * * * *